US011156121B2

(12) United States Patent
Model et al.

(10) Patent No.: US 11,156,121 B2
(45) Date of Patent: Oct. 26, 2021

(54) ADJUSTABLE GUIDE APPARATUS FOR A TURBINE, TURBINE FOR AN EXHAUST TURBOCHARGER AND EXHAUST TURBOCHARGER

(71) Applicant: IHI CHARGING SYSTEMS INTERNATIONAL GMBH, Amt Wachsenburg Ot Ichtershausen (DE)

(72) Inventors: Max Model, Darmstadt (DE); Marc-Pierre Weiss, Mannheim (DE); Vladimir Petrov, Eppelheim (DE)

(73) Assignee: IHI CHARGING SYSTEMS INTERNATIONAL GMBH, Amt Wachsenburg ot Ichtershausen (DE)

( * ) Notice: Subject to any disclaimer, the term of this patent is extended or adjusted under 35 U.S.C. 154(b) by 0 days.

(21) Appl. No.: 16/781,102

(22) Filed: Feb. 4, 2020

(65) Prior Publication Data
US 2020/0173304 A1 Jun. 4, 2020

Related U.S. Application Data

(63) Continuation-in-part of application No. PCT/EP2018/000387, filed on Aug. 3, 2018.

(30) Foreign Application Priority Data

Aug. 17, 2017 (DE) ..................... 10 2017 118 795.2

(51) Int. Cl.
*F01D 17/16* (2006.01)
*F02B 37/24* (2006.01)
*F02C 6/12* (2006.01)

(52) U.S. Cl.
CPC ............ *F01D 17/165* (2013.01); *F02B 37/24* (2013.01); *F02C 6/12* (2013.01); *F05D 2220/40* (2013.01)

(58) Field of Classification Search
CPC .......... F01D 17/165; F02B 37/24; F02C 6/12; F05D 2220/40
See application file for complete search history.

(56) References Cited

U.S. PATENT DOCUMENTS

2007/0277525 A1   12/2007  Stilgenbauer
2012/0315164 A1*  12/2012  Mayernick ............... F02C 6/12
                                                             417/406
2014/0248137 A1*   9/2014  Inoue ................... F01D 17/165
                                                              415/159

FOREIGN PATENT DOCUMENTS

DE    102 09 444 A1    9/2003
DE    102 09172 A1     9/2003
(Continued)

OTHER PUBLICATIONS

The International Search Report for the corresponding international application No. PCT/EP2018/000387, dated Nov. 13, 2018, in the German language (3 pages).
(Continued)

*Primary Examiner* — Audrey B. Walter
*Assistant Examiner* — Edward Bushard
(74) *Attorney, Agent, or Firm* — Ronald S. Lombard

(57) ABSTRACT

An adjustable guide apparatus for a turbine, comprising a bearing ring with a plurality of guide vanes, wherein the guide vanes are rotatably mounted on the bearing ring with the aid of guide vane shafts, wherein, in order to position the guide vane, the guide vane shaft is allocated an adjusting lever which is designed to be able to engage in a rotatable rotating ring of the adjustable guide apparatus, and wherein, in order to be held in an exhaust gas guiding section of the turbine, the adjustable guide apparatus has a support ring, and wherein the support ring serves to mount the rotating ring. In accordance with the invention the rotating ring is formed to be free of contact with the support ring. Further- (Continued)

more, the invention relates to a turbine and to an exhaust turbocharger.

14 Claims, 3 Drawing Sheets

(56) References Cited

FOREIGN PATENT DOCUMENTS

| DE | 10209172 A1 * | 9/2003 | ........... F01D 17/165 |
|---|---|---|---|
| DE | 10 2007 052 735 A1 | 5/2009 | |
| DE | 10 2008 017 821 A1 | 10/2009 | |
| DE | 10 2008 014 678 A1 | 4/2010 | |
| DE | 10 2010 042 181 A1 | 4/2012 | |
| DE | 102010042181 A1 * | 4/2012 | ........... F01D 17/165 |
| DE | 10 2012 003 213 A1 | 8/2013 | |

OTHER PUBLICATIONS

The English translation of the International Search Report for the corresponding international application No. PCT/EP2018/000387 (3 pages).

* cited by examiner

ADJUSTABLE GUIDE APPARATUS FOR A TURBINE, TURBINE FOR AN EXHAUST TURBOCHARGER AND EXHAUST TURBOCHARGER

CROSS-REFERENCE TO RELATED APPLICATIONS

This is a continuation-in-part application of pending international application PCT/EP2018/000387 filed Aug. 3, 2018, and claiming the priority of German application No. 10 2017 118 795.2 filed Aug. 17, 2017. The said International application PCT/EP2018/000387 and German application No. 10 2017 118 795.2 are both incorporated herein by reference in their entireties as though fully set forth.

BACKGROUND OF THE INVENTION

The invention relates to an adjustable guide apparatus for a turbine, a turbine for an exhaust turbocharger and an exhaust turbocharger according to the claims.

Laid-open document DE 10 2014 203 498 A1 discloses an adjustable guide apparatus for a turbine. The adjustable guide apparatus can be used to condition a flow of exhaust gases exiting an internal combustion engine against a turbine wheel received in an exhaust gas guiding section of the turbine. For this purpose, the guide apparatus comprises a number of adjustable guide vanes which are positioned in a nozzle channel in the exhaust gas guiding section, upstream of a wheel chamber in the exhaust gas guiding section in which the turbine wheel is rotatably received. The guide apparatus has a bearing ring with a plurality of guide vanes, wherein the guide vanes are rotatably mounted on the bearing ring with the aid of guide vane shafts. The guide vane shafts are in principle allocated adjusting levers which are designed to be able to engage in a rotating ring. The rotating ring has apertures to receive the adjusting levers.

The rotating ring is in the form of an annular disc and is mounted so as to be supported radially and axially. The axial and radial support is provided with the aid of the bearing ring. In order to reduce friction, the rotating ring has apertures on its bearing surface disposed opposite the bearing ring. Surface contact between the rotating ring and the bearing ring, and consequently the friction loss owing to surface rubbing, is thereby reduced.

It is the object of the invention to provide an adjustable guide apparatus which is characterized by a further reduction in friction losses, which is to be achieved with the aid of simple measures. Furthermore, it is an object of the invention to provide a turbine which has increased operational reliability, and an exhaust turbocharger with a significantly improved degree of efficiency.

SUMMARY OF THE INVENTION

These objects are achieved with the aid of an adjustable guide apparatus for a turbine, and a turbine and an exhaust turbocharger having the features of the claims. Advantageous embodiments with expedient and non-trivial developments of the invention are specified in the dependent claims.

An adjustable guide apparatus of this type for a turbine includes a bearing ring with a plurality of guide vanes, wherein the guide vanes are rotatably mounted on the bearing ring with the aid of guide vane shafts. In order to position the guide vane, the guide vane shaft is allocated an adjusting lever which is designed to be able to engage in a rotatable rotating ring of the adjustable guide apparatus. In order to be held in an exhaust gas guiding section of the turbine, the adjustable guide apparatus has a support ring which serves to mount the rotating ring. In accordance with the invention, the rotating ring is formed to be free of contact with the support ring. The advantage is in a simple design of the bearing ring which is no longer required for direct mounting of the rotating ring. The rotating ring is mounted on the support ring which can be simply produced, usually with the aid of a stamping process, and is usually produced from a metal ring with a small material thickness.

By the simple design of the bearing ring, it is possible for it to be produced with a reduced amount of material and in less time since it is no longer complex. All in all, this leads to an inexpensive adjustable guide apparatus. Since no contact is established between the support ring and the rotating ring, friction between the movable elements of the adjustable guide apparatus is substantially reduced. More rapid adjustment of the guide vanes is possible, which in turn is accompanied by improved response behaviour of the turbine wheel.

In one embodiment of the adjustable guide apparatus in accordance with the invention, the rotating ring is radially and/or axially guided with the aid of at least one guiding pin and/or a guiding roller, wherein the guiding pin and/or the guiding roller is received on the support ring. The advantage is that a friction-reduced adjustable guide apparatus is produced. Thus with the aid of the guiding pin, in particular with the aid of axial stop surfaces formed on the guiding pin, a specific friction value and therefore the occurring friction can be adjusted, in particular reduced. With the aid of the guiding roller, radial contact can be established with reduced friction.

When using the guiding roller, the axial guidance is partly or entirely absent, whereby a further reduction in friction is achieved.

A combination of guiding pin and guiding roller brings about a reduction in friction while ensuring the guiding function at the same time as offering the potential for cost optimization.

In a further embodiment, the support ring is in the form of a planar disc ring, whereby it is inexpensive to produce. For example, it can be produced purely by a stamping process. In other words, this means that, apart from the stamping process, no further process and/or no further working step is required and so the support ring can be produced inexpensively.

In a further embodiment of the adjustable guide apparatus in accordance with the invention, the support ring is connected to the guiding pin and/or the guiding roller in an integrally bonded and/or frictionally connected and/or form-fitting manner.

Further inexpensive production of the adjustable guide apparatus is achieved by a press-fit formed between the guiding pin and/or the guiding roller and the support ring.

In a further inexpensive embodiment of the guide apparatus in accordance with the invention, the support ring can be produced by stamping. Stamping as a production process is a simple production process which is extremely favourable in terms of cost especially for thin components and so an inexpensive adjustable guide apparatus can be created.

A further aspect of the invention relates to a turbine for an exhaust turbocharger, having an exhaust gas guiding section, which can have a flow passing through it, and a turbine wheel rotatably received in a wheel chamber of the exhaust gas guiding section. Upstream of the turbine wheel, an adjustable guide apparatus is disposed in the exhaust gas guiding section. The adjustable guide apparatus is designed according to the claims. The advantage of this turbine is an increase in the degree of efficiency owing to reduced friction in the adjustable guide apparatus.

In particular, an exhaust turbocharger in accordance with the invention having a turbine in accordance with the invention is characterized by a particularly high degree of efficiency owing to the reduction in friction losses. In turn, this leads to a reduction in exhaust gas emissions, in particular in connection with an internal combustion engine provided in vehicles, since an increase in the degree of efficiency of the exhaust turbocharger leads to optimized coordination between the exhaust turbocharger and the internal combustion engine.

BRIEF DESCRIPTION OF THE DRAWINGS

Further advantages, features and details of the invention will be apparent from the following description of preferred exemplified embodiments and with reference to the drawings. The features and combinations of features mentioned earlier in the description and the features and combinations of features mentioned hereinafter in the description of the figures and/or illustrated in the figures alone can be employed not only in the combination stated in each case but also in other combinations or on their own without departing from the scope of the invention. Like or functionally identical elements are allocated identical reference signs. For reasons of clarity, it is possible for the elements not to be provided with their reference sign in all figures but this does not mean that they are no longer allocated same. In the figures.

DETAILED DESCRIPTION OF THE INVENTION

An exhaust gas guiding section, which can have a flow passing through it and is not illustrated in more detail, of an exhaust turbocharger is provided in an exhaust gas tract, not illustrated in more detail, of an internal combustion engine, not illustrated in more detail, which is an Otto engine or a diesel engine. The exhaust turbocharger further has a fresh air guiding section, which can have a flow passing through it and is not illustrated in more detail, and a bearing section, not illustrated in more detail, which is disposed in an intake tract, not illustrated in more detail, of the internal combustion engine.

The exhaust turbocharger has a rotor assembly, not illustrated in more detail, which includes a compressor wheel, not illustrated in more detail, for drawing in and compressing combustion air, a turbine wheel, not illustrated in more detail, for expansion of exhaust gas, and a shaft, which is not illustrated in more detail and connects the compressor wheel to the turbine wheel for conjoint rotation therewith, with an axis of rotation. The shaft is rotatably mounted in the bearing section of the exhaust turbocharger which is positioned between the air guiding section and the exhaust gas guiding section.

An inlet channel, not illustrated in more detail, is formed in the exhaust gas guiding section in order for the exhaust gas to flow into the exhaust gas guiding section. The inlet channel serves to condition the exhaust gas which causes the turbine wheel to rotate during operation of the internal combustion engine. With the aid of the shaft, the compressor wheel is likewise caused to rotate and so combustion air is drawn in and compressed thereby.

Downstream of the inlet channel, a spiral channel, not illustrated in more detail, is disposed in the exhaust gas guiding section and serves to provide a rotationally symmetrical flow. Furthermore, the spiral channel is designed as a connection channel between the inlet channel and a nozzle channel, not illustrated in more detail, which is positioned downstream of the spiral channel. Downstream of the nozzle channel a wheel chamber, not illustrated in more detail, is provided in the exhaust gas guiding section in which the turbine wheel is rotatably received. Downstream of the wheel chamber, the exhaust gas guiding section has an outlet channel, not illustrated in more detail, for the escape of the exhaust gas from the exhaust gas guiding section.

In order that the greatest possible degree of exhaust turbocharger efficiency can be achieved both at low loads and low rotational speeds of the internal combustion engine and also at high loads and high rotational speeds of the internal combustion engine, the exhaust gas can be conditioned with the aid of an adjustable guide apparatus 1 which is disposed in the exhaust gas guiding section.

Figure 1:
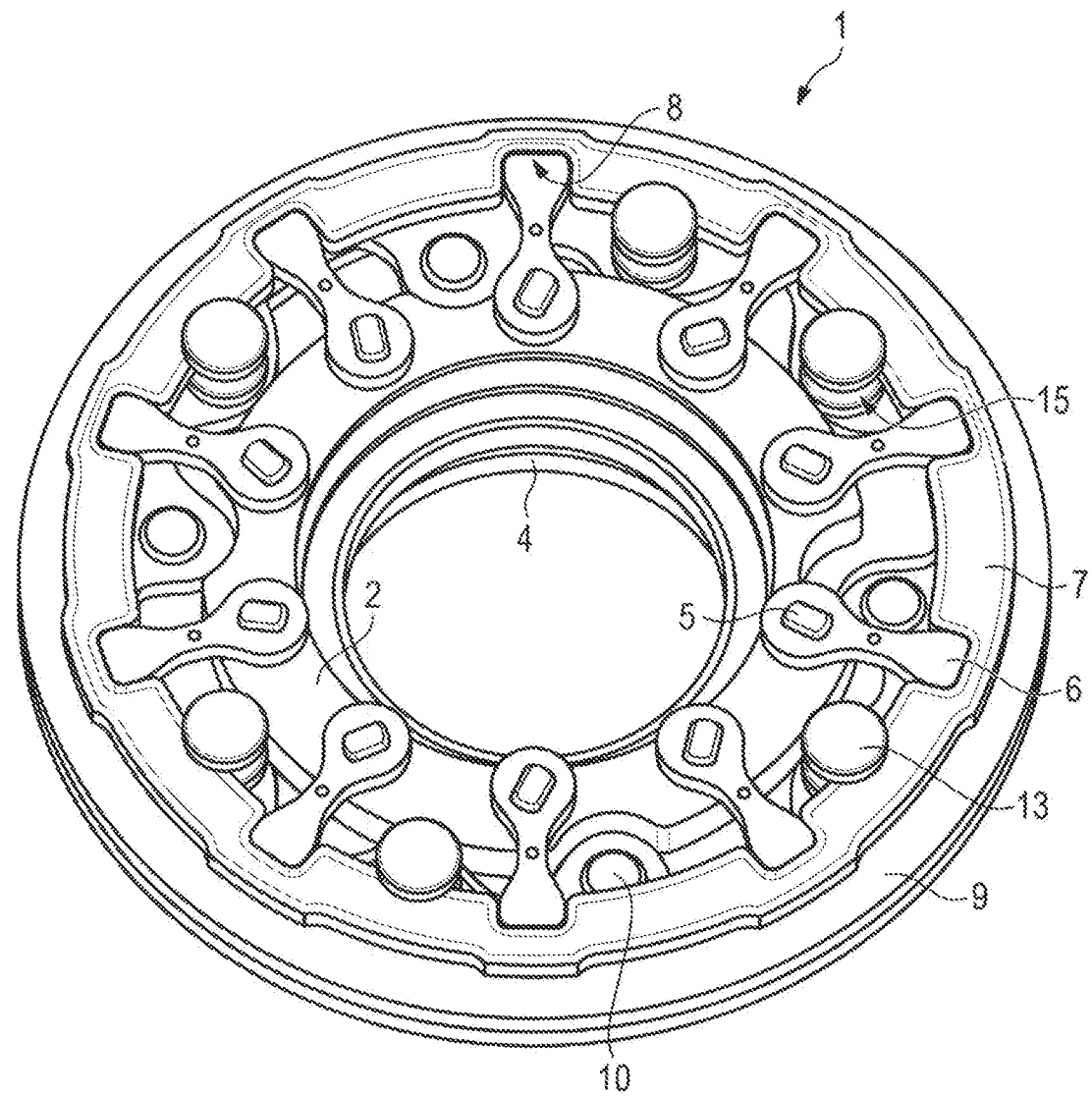
FIG. 1 shows a perspective plan view of an adjustable guide apparatus in accordance with the invention.
Figure 2:
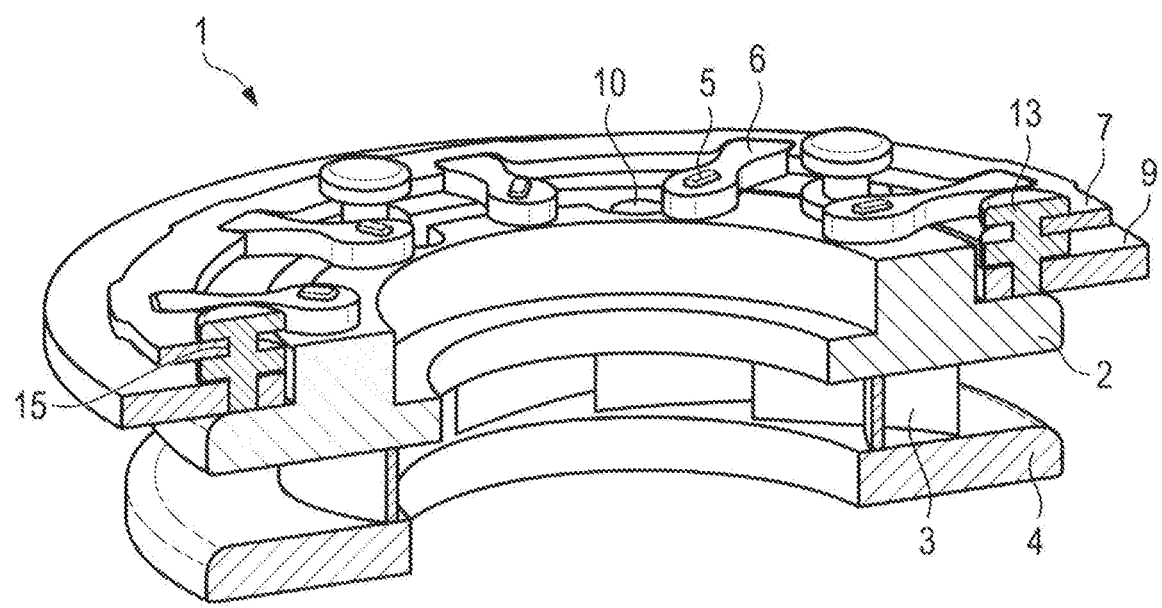
FIG. 2 shows a perspective cross-sectional view of the guide apparatus according to FIG. 1.
Figure 4:
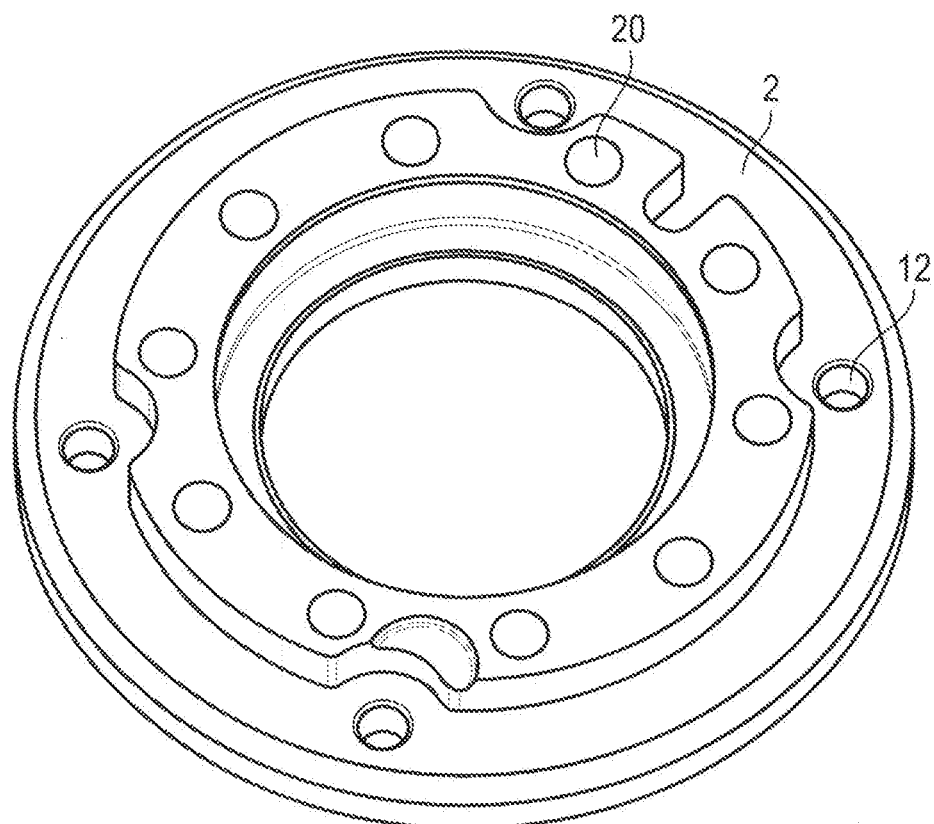
FIG. 4 shows a perspective plan view of a bearing ring of the adjustable guide apparatus according to FIG. 1.

An adjustable guide apparatus 1 in accordance with the invention is formed according to FIG. 1. FIG. 2 illustrates the adjustable guide apparatus 1 in accordance with the invention in a perspective cross-sectional view. The guide apparatus 1 is designed to be able to annularly encompass the turbine wheel and has a bearing ring 2, see in particular FIG. 4, to receive guide vanes 3 which are provided for flow conditioning. The guide vanes 3 are rotatably mounted on the bearing ring 2.

The bearing ring 2 is positioned in the exhaust gas guiding section in such a way that the guide vanes 3 are disposed in the nozzle channel. A contour ring 4, which is designed for simplified mounting of the guide apparatus 1 in the form of a cassette in the exhaust gas guiding section, is positioned opposite the bearing ring 2. Furthermore, the contour ring 4 serves for further mounting of the guide vanes 3.

For rotatable mounting of the guide vanes 3 on the bearing ring 2, one guide vane shaft 5 per guide vane 3 is provided, which shaft is connected to the guide vane 3 for conjoint rotation therewith and—being rotatably mounted on the bearing ring 2—is received in a bearing opening 20. In order to rotate the guide vane shaft 5, and therefore the guide vane 3, the guide vane shaft 5 has, at its end facing away from the guide vane 3, an adjusting lever 6 which is likewise connected to the guide vane shaft 5 for conjoint rotation therewith.

The rotational movement of the guide vanes 3 can be initiated with the aid of a rotating ring 7 which is positioned coaxially with the bearing ring 2 in the adjustable guide apparatus 1. The rotating ring 7 has apertures 8 into which the adjusting levers 6 are designed to be able to engage, wherein, for engagement into the corresponding aperture, an end of the adjusting lever 6 facing away from the guide vane shaft 5 is ideally provided.

For axial and radial securing of the rotating ring 7, the adjustable guide apparatus 1 has a support ring 9 which is provided for mounting of the adjustable guide apparatus 1 in the exhaust gas guiding section. In other words this means that, within the scope of the invention, the support ring 9 is designed for indirect mounting of the rotating ring 7 so that, in addition to its original purpose of mounting the adjustable guide apparatus 1 in the exhaust gas guiding section, it serves for mounting of the rotating ring 7.

Figure 3:
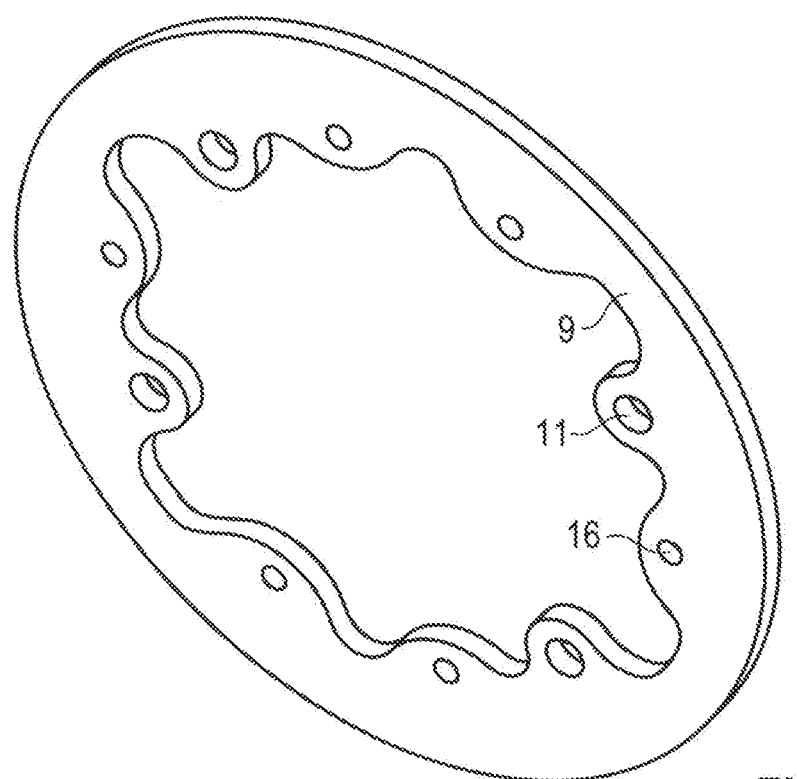
FIG. 3 shows a perspective view of a support ring of the guide apparatus according to FIG. 1.

The support ring 9, which is illustrated in particular in a perspective view in FIG. 3, is formed to be free of contact with the rotating ring 7. It is immovably fixed on the bearing ring 2 with the aid of four fastening means 10. The fastening means 10 are in the form of screws extending through the support ring 9, these screws being received in fastening openings 11 in the support ring 9. In order to receive the fastening means 10, the bearing ring 2 has receiving openings 12.

The rotating ring 7 is radially and axially mounted with the aid of guiding pins 13, wherein the guiding pins 13 are immovably received in the support ring 9. In the illustrated exemplified embodiment, the guiding pins 13 are designed in the form of bolt-like elements comprising a groove 15, in this embodiment. Axial guiding of the rotating ring 7 can be achieved simply and inexpensively with the aid of the groove 15. The guiding pins 13 are received in the support ring 9 in positioning openings 16.

Figure 5:
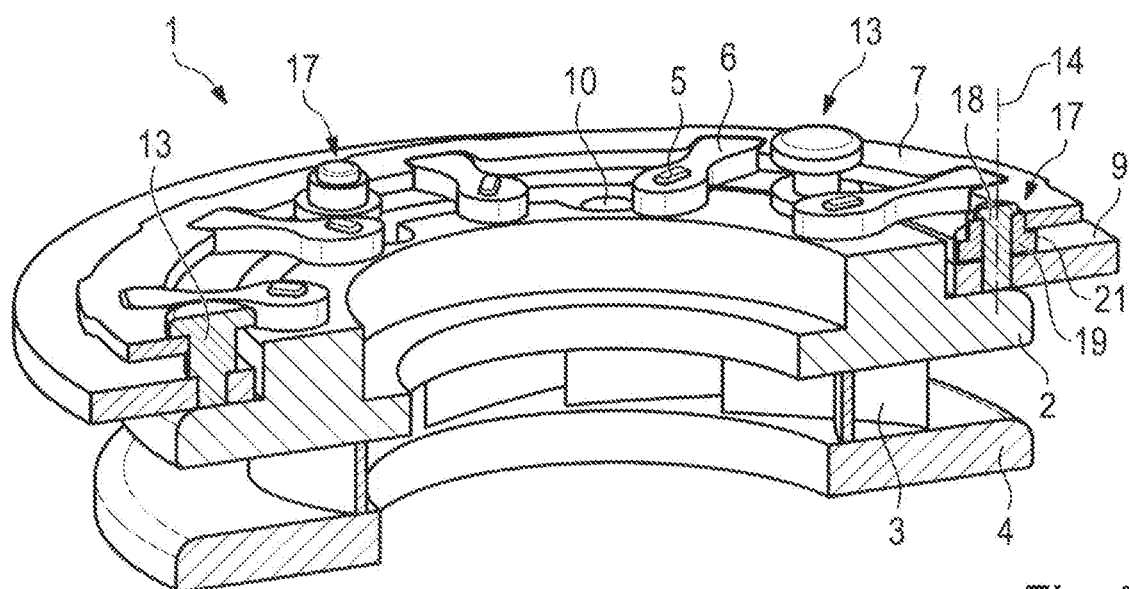
FIG. 5 shows a perspective cross-sectional view of the adjustable guide apparatus in accordance with the invention in an alternative embodiment.

In a further exemplified embodiment, see FIG. 5, the radial and axial mounting of the rotating ring 7 is additionally effected with the aid of guiding rollers 17 immovably received on the support ring 9. In other words this means that guiding pins 13 and guiding rollers 17 are also provided for radial and axial securing of the rotating ring 7. The radial mounting and axial mounting can also each be allocated to a guiding element 13, 17, i.e. to the guiding pin 13 or the guiding roller 17. It would also be possible for only one mounting arrangement, axial or radial, to be provided per guiding element 13, 17.

The guiding roller 17 includes a pin 18 and a sleeve 19 received on the pin 18 so as to be able to rotate about a pin axis 14. This form of mounting arrangement is similar to a roller bearing since the rotating ring 7 can roll on the sleeve 19, and leads to low-friction mounting of the rotating ring 7. The sleeve 19 has a shoulder 21, with the aid of which at least one-sided axial mounting of the rotating ring 7 in addition to the radial mounting is rendered possible. One of the guiding pins 13 as shown in FIG. 5 of this embodiment does not include groove 15.

The guiding rollers 17 and the guiding pins 13 can be connected to the support ring 9 with the aid of a joining process e.g. riveting, clamping, screwing or an integrally bonding joining process.

What is claimed is:

1. An adjustable guide apparatus for a turbine, comprising a bearing ring (2) with a plurality of guide vanes (3), wherein the guide vanes (3) are rotatably mounted on the bearing ring (2) with the aid of guide vane shafts (5), wherein, in order to position the guide vane (3), the guide vane shaft (5) is allocated an adjusting lever (6) which is configured to engage in a rotatable rotating ring (7) of the adjustable guide apparatus (1), and wherein, in order to be held in an exhaust gas guiding section of the turbine, the adjustable guide apparatus (1) has a support ring (9), and wherein the support ring (9) serves to mount the rotating ring (7), characterized in that
the support ring (9) is immovably fixed on the bearing ring (2) in an encircling relationship therewith, the rotating ring (7) is positioned coaxially with the bearing ring (2),
the rotating ring (7) is radially and/or axially guided with the aid of at least one first guiding pin (13) comprising a rotating ring engagement groove (15) therein in operative arrangement with the rotating ring (7),
wherein the first guiding pin (13) is immovably received on the support ring (9) in direct contacting relationship therewith,
the rotating ring (7) is formed to be free of contact with the support ring (9), the rotating ring (7) is operatively spaced from the support ring (9) by engagement with the groove (15) of the first guiding pin (13), and,
wherein the support ring (9) is formed as a planar disc.

2. The adjustable guide apparatus as claimed in claim 1, characterized in that
the support ring (9) is produced with the aid of a stamping process.

3. The adjustable guide apparatus as claimed in claim 1, characterized in that
the guiding roller (17) comprises a pin (18) operatively carrying a rotatable sleeve (19) having a shoulder (21) for one-sided axial mounting and radial mounting of the rotating ring (7).

4. The adjustable guide apparatus as claimed in claim 1, characterized in that
the support ring (9) is connected to the first guiding pin (13) in an integrally bonded and/or frictionally connected and/or form-fitting manner.

5. The adjustable guide apparatus as claimed in claim 4, characterized in that
a press-fit is formed between the first guiding pin (13) and the support ring (9).

6. A turbine for an exhaust turbocharger, having an exhaust gas guiding section, which can have a flow passing through it, and a turbine wheel rotatably received in a wheel chamber of the exhaust gas guiding section, and wherein, upstream of the turbine wheel, an adjustable guide apparatus (1) is disposed in the exhaust gas guiding section, characterized in that
the adjustable guide apparatus (1) is configured as claimed in claim 1.

7. An exhaust turbocharger having a turbine configured as claimed in claim 6.

8. The adjustable guide apparatus as claimed in claim 1, characterized in that
the rotating ring (7) is also radially and/or axially guided with the aid of at least one guiding roller (17), wherein the guiding roller is received on the support ring (9).

9. The adjustable guide apparatus as claimed in claim 8, characterized in that the rotating ring (7) is also radially and/or axially guided with the aid of at least one second guiding pin (13) immovably received on the support ring (9) in direct contacting relationship therewith, the second guiding pin (13) not having a rotating ring engagement groove (15) therein.

10. The adjustable guide apparatus as claimed in claim 8, characterized in that
a press-fit is formed between the guiding roller (17) and the support ring (9).

11. The adjustable guide apparatus as claimed in claim 8, characterized in that
the support ring (9) is connected to the at least one guiding roller (17) in an integrally bonded and/or frictionally connected and/or form-fitting manner.

12. The adjustable guide apparatus as claimed in claim 11, characterized in that
a press-fit is formed between the guiding roller (17) and the support ring (9).

13. A turbine for an exhaust turbocharger, having an exhaust gas guiding section, which can have a flow passing through it, and a turbine wheel rotatably received in a wheel chamber of the exhaust gas guiding section, and wherein, upstream of the turbine wheel, an adjustable guide apparatus (1) is disposed in the exhaust gas guiding section, characterized in that the adjustable guide apparatus (1) is configured as claimed in claim 8.

14. An exhaust turbocharger having a turbine configured as claimed in claim 13.

* * * * *